April 15, 1941.  A. NUTTING  2,238,280
AUTOMATIC AUTOMOTIVE AIR FILTER
Filed April 4, 1938
Fig.1
Fig.2
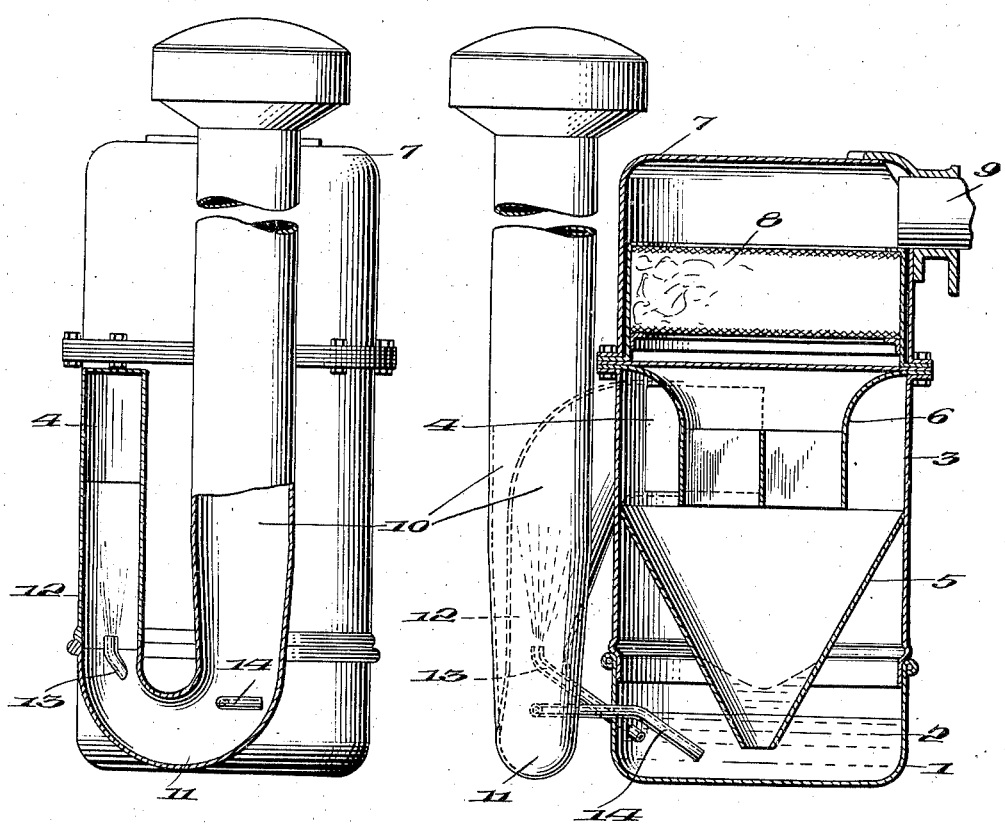
Fig.3
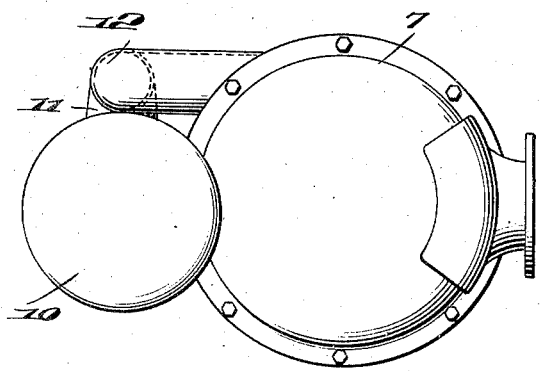
INVENTOR.
Arthur Nutting,
BY Arahur H Robert
ATTORNEYS.

Patented Apr. 15, 1941

2,238,280

UNITED STATES PATENT OFFICE 2,238,280

AUTOMATIC AUTOMOTIVE AIR FILTER

Arthur Nutting, Louisville, Ky., assignor to American Air Filter Company, Inc., Louisville, Ky., a corporation of Delaware Application April 4, 1938, Serial No. 199,850

2 Claims. (Cl. 183—8)

This invention relates to automotive air filters of the automatic or self-cleaning type, wherein the incoming air is made to entrain oil and then passed through a viscous filter medium to remove its dust and oil content. Filters of this type are termed "automotive" because they are largely used to clean the intake air of compressors and various types of oil, gas and gasoline engines. In such use they necessarily encounter air containing varying proportions of both linty and granular dust. The filter medium functions to remove the dust from the air flow, while the oil functions to wash it from the filter medium into an oil reservoir from which it can be removed at desired periods simply by changing the oil.

In operation, however, it has been found that linty particles become so entangled upon the air cleaning surfaces of the filter medium that their removal is not effected by the drainage of oil. Consequently, as use continues, a deposit of lint is built up within the filter medium. This deposit is highly objectionable: because, as it "grows," it renders the flow of oil increasingly less effective in the removal of granular particles; because it ultimately necessitates the removal of the filter medium at intervals, which become annoyingly frequent in the many areas where much lint is present; and because it is so difficult to remove from the medium that effective cleaning is not always possible unless the medium is entirely disassembled, the latter result often leading to the reuse of improperly cleaned units.

The principal objects of the present invention are to prevent the "growth" of the lint deposit in the filter medium, and to maintain an operating resistance characteristic equivalent to the characteristic of the medium when clean.

In most commercial automotive filters the oil fed to the medium remains therein during operation and drains therefrom only when operation ceases. In such structures it has been found that where the air acts directly on the main body of oil and then passes through the filter medium, the rate of oil feed varies directly with the rate of air flow. If the oil is fed at a rate below a certain "critical" rate, it will gradually accumulate in the medium until its level rises to the top of the medium whereupon, with continued feeding, the medium will "blow oil" into the clean air outlet. In other words, it will "blow oil" only when saturated if the feeding rate is maintained below the "critical" value. On the other hand, the medium will tend to "blow oil" before saturation when the "critical" rate is exceeded. In practice it has been found difficult to hold the oil feeding rate below the "critical" value. For example, with an efficient filter medium designed to operate within a certain range of air flow and being of minimum air flow depth and resistance, the oil flow, in the lower ranges of operation, will normally be well below the "critical" value and, in the upper ranges, well above such value. Consequently, it has heretofore been considered necessary to reduce the volume of oil available for feeding purposes not only below the volume required to saturate the medium but sufficiently below to prevent "blowing oil" at the highest oil feeding rate occurring in the operating range. This renders necessary either a substantial decrease in the volume of feeding oil or a substantial increase in the air flow depth of the medium or a compromise between both.

Another important object of my invention is to reduce the rate at which oil is fed to the medium sufficiently to prevent "blowing oil" in the operating range and thereby permit the equalization of feeding and saturation oil volumes either by decreasing the air flow depth of the medium or increasing the amount of feeding oil, as desired.

I have found that the foregoing objectives may be attained by arranging the dust-laden air to pick up oil as before and then precleaning the air before its passage into the filter medium by passing it through a vertically arranged conical double-vortex "cyclone" separator having upper inlet and outlet openings and a bottom opening. For convenience and clarity, the term—vertically arranged conical double-vortex "cyclone" separator having upper inlet and outlet openings and a bottom opening—is used herein to designate that well-known form of mechanical air-cleaning device which has, at its smaller end, a bottom opening, and, at its larger end, openings providing an axial outlet and a tangential or equivalent swirl-producing inlet and which compels the entering air to form an outer vortex as it travels spirally downward from the inlet toward the smaller end and then to reverse its direction and form an inner vortex as it travels spirally upward toward the outlet opening. The "cyclone" removes substantially all of the linty particles and thus prevents any appreciable deposit of lint in the filter medium. It also removes most of the heavy and much of the light granular particles, together with most of the oil and thus limits the operation of the medium to the removal of small charges of oil and "fines" i. e. granular dust particles of small size. The removal of oil by the "cyclone" has a number of advantages; first it establishes a rapid circulation of oil from the reservoir through the "cyclone" back to the reservoir, which is effective to convey separated dust from the "cyclone" to the reservoir where the dust may remain while the oil again becomes available for oil feeding purposes; secondly, in reducing the flow of oil to the medium, it produces a range of flow rates well below the "critical" value of a filter medium designed to remove "fines" and greatly prolongs the feeding time required to saturate the filter medium, but, nevertheless, maintains a volume of flow sufficient for effective coating and cleaning purposes. As a consequence, the filter oil is eliminated as a factor affecting the size of the medium; hence the latter may be minimized in size. In fact, it may be so greatly reduced in size that the resulting decrease in resistance substantially compensates for the resistance introduced by the "cyclone." It will thus be appreciated that, by incorporating a "cyclone" in the structure of an automotive filter, I am able to eliminate clogging of the filter medium, to regulate the flow of filter oil, to maximize the filter oil feeding time, to equalize feeding and saturation oil volumes, to maintain a resistance characteristic during operation substantially equivalent to the resistance characteristic of the device when clean, and to accomplish such objectives without materially increasing the resistance of the device, as a whole.

The invention is illustrated in the accompanying drawing, wherein:

Figure 1 is a partly broken side elevation of an automotive filter embodying the invention;

Figure 2 is a vertical sectional view of the device at right angles to Figure 1; and Figure 3 is a top plan view thereof.

While various forms of structures may be used to carry out the proposed steps of entraining oil in the incoming air and then successively cycloning and filtering it, a satisfactory form is illustrated. This form comprises: a cylindrical casing having separable oil bath, cycloning, and filtering sections; and an inlet pipe connected to the oil bath to entrain oil therefrom and to the "cyclone" to deliver the mixture of oil and air thereto.

The oil bath section of the casing comprises a cylindrical cup 1 having an open top and a closed bottom and being of a depth sufficient to hold the desired amount of oil or other bathing medium 2. This section is frictionally or otherwise removably secured to the lower end of the "cyclone" section.

The "cyclone" section includes a cylinder 3, having an inlet opening 4, adjacent its upper end, a conical bottom 5 and a top 6. The conical bottom 5 cooperates with the wall 3 to form a "cyclone" separating chamber, the outlet of which is provided by the top 6. To this end, the conical bottom is in the form of an open ended cone which is vertically arranged within the cylinder 3. The upper or larger end of the cone 5 is fitted against the wall of the cylinder 3 slightly below the inlet opening 4 while its lower end is arranged to extend into the oil bath 2 when the bottom 1 is secured to the lower end of the cylinder 3. The top 6 is in the form of a cylindrical pipe which extends downwardly into the separating chamber for a suitable distance. This pipe, in accordance with usual "cyclone" practice, is made of a diameter large enough to provide a satisfactory outlet for the "cyclone" and, at the same time, small enough to define, in combination with the surrounding wall of the cylinder 3, a suitable space for the flow of incoming air. The pipe 6 is secured in position by flaring its upper end outwardly into the space between the securing flanges on the "cyclone" and filtering sections.

The filtering section comprises a cylindrical cap 7, having a closed top and an open bottom which is flanged for securement to the upper end of the "cyclone" section. The filtering section contains a horizontally disposed filter unit 8, which is removably arranged within but closely fitted to the vertical walls of the cap 7. This unit is removably secured in position by interposing its securing flanges between those of the "cyclone" and filtering sections. The arrangement of the filter unit thus compels all air, discharged through the "cyclone" outlet pipe 6, to pass through it before reaching the outlet opening 9 adjacent the upper end of the filtering section.

While any suitable means may be utilized to mix oil with the incoming air and deliver the mixture to the inlet 4 of the "cyclone," the means shown includes an air inlet passage formed by down-draft pipe 10, a connecting elbow 11 and an up-draft pipe 12 leading to the "cyclone" inlet 4 and discharging through it tangentially into the "cyclone," and an oil inlet passage formed by pipe 13, which extends from the oil bath to the air inlet passage with its discharge end facing upstream in order to produce an oil aspirating action. To insure effective oil aspiration, a Venturi section is formed in the air inlet passage by tapering the down-draft pipe 10 to provide a downwardly converging area leading into the elbow 11 and flaring the up-draft pipe 12 to provide an upwardly diverging area leading from the elbow 11. The pipe 13 is arranged to discharge into low pressure area thus created in the upwardly diverging section.

Before operation, a suitable level of oil is provided in the oil cup 1 as indicated by dotted lines therein. Upon starting the engine or compressor, to which the outlet 9 is connected, air will be drawn through the inlet passage and discharged tangentially into the "cyclone." The air swirls outwardly and downwardly through the "cyclone," and thence passes inwardly and upwardly through the "cyclone" into and through the filtering section ultimately reaching the engine. The low pressure area, created within the "cyclone," causes the initial level of the oil bath, within the "cyclone," to rise to some higher level, as indicated in solid lines in Figure 2, while the level of the bath between the "cyclone" and the bottom cup 1 is correspondingly lowered.

When the air flows through the up-draft pipe 12, it aspirates oil through aspirating pipe 13 into the air stream. As the resulting mixture swirls downwardly through the "cyclone," practically all of the lint, most of the heavy and much of the light granular dust, and most of the oil is effectively removed from the air. The aspirating flow of oil from the bath, and the return flow of oil from the "cyclone" to the bath, set up a rapid circulation of oil which carries the separated dust downwardly into the reservoir where the oil again becomes available for further circulation purposes.

A certain amount of oil and dust will escape removal in the "cyclone" and, consequently, pass through the "cyclone" outlet into the filter medium 8. Inasmuch as the quantity of oil and dust escaping the "cyclone" is relatively small, the filter medium can be made both thin and dense to effect efficient separation without interposing an undue resistance to the air flow. The oil separated by the filter medium remains therein during operation and, as operation continues, its level rises. Since the rate at which oil is fed to the filter medium is very low, the rate, at which its level rises in the filter medium, is correspondingly low. Consequently, the filter will operate for a relatively long period of time before the medium becomes saturated. As the oil level in the medium rises, the oil level in the bath falls; hence to discontinue the feeding of filter oil, when saturation is reached, the inlet opening of aspirating pipe 13 may be placed at the corresponding level of the bath so that it becomes uncovered at that level.

When operation ceases, the oil within the medium will drain therefrom through the "cyclone" into the bath, carrying with it the filtered dust and thus cleaning the filter and conditioning it for renewed operation. In addition, it may be pointed out that, during operation, dust is apt to collect in the elbow 11. To remove this collection, a pipe 14 is made to extend from the bath into the elbow, with its highest point along the highest level of the bath, an arrangement permitting a small amount of oil to drain from the bath and drip into the elbow when the device is idle. However, as soon as operation is again instituted, the incoming air will sweep such "elbow" oil and dust into the "cyclone."

Having described my invention, I claim:

1. An automotive air filter comprising: a casing having a top air outlet, a bottom liquid reservoir and an air inlet therebetween; a viscous impingement air filter medium operatively positioned within said casing to filter air passing between said inlet and outlet; an open-ended cone vertically arranged within and fitted to said casing between said inlet and reservoir, the smaller end of said cone extending downwardly into said reservoir; said cone cooperating with said casing to form a vertically arranged conical double-vortex "cyclone" separator which is adapted to receive air tangentially through said inlet, centrifugally preclean it and then discharge it upwardly through said medium; an air-inlet pipe connected to said inlet; and means for supplying liquid from said reservoir to said air inlet pipe.

2. An improvement in automotive air cleaners of the self-cleaning type, having a lower reservoir and an upper viscous-impingement air filter medium, wherein liquid from the reservoir is mixed with incoming dust-laden air and the mixture fed to the medium which operates to remove dust and liquid and to permit the collected liquid to drain gravitationally and wash dust from the medium comprising: a double vortex "cyclone" separator, having upper inlet and outlet openings and a bottom opening, vertically arranged between the medium and reservoir with its inlet opening positioned to receive incoming air containing dust and liquid, its bottom opening communicating with the reservoir, and its outlet opening positioned adjacent the medium to discharge upwardly into the medium, said separator being operative centrifugally to remove some of the dust and liquid from the air and return it through the bottom opening to the reservoir and thereby reduce and regulate the amount of liquid and dust carried into the medium.

ARTHUR NUTTING.